Oct. 6, 1953
N. J. URQUHART ET AL
2,654,669
METHOD OF REDUCING IRON OXIDES
Filed Oct. 2, 1951
4 Sheets-Sheet 1
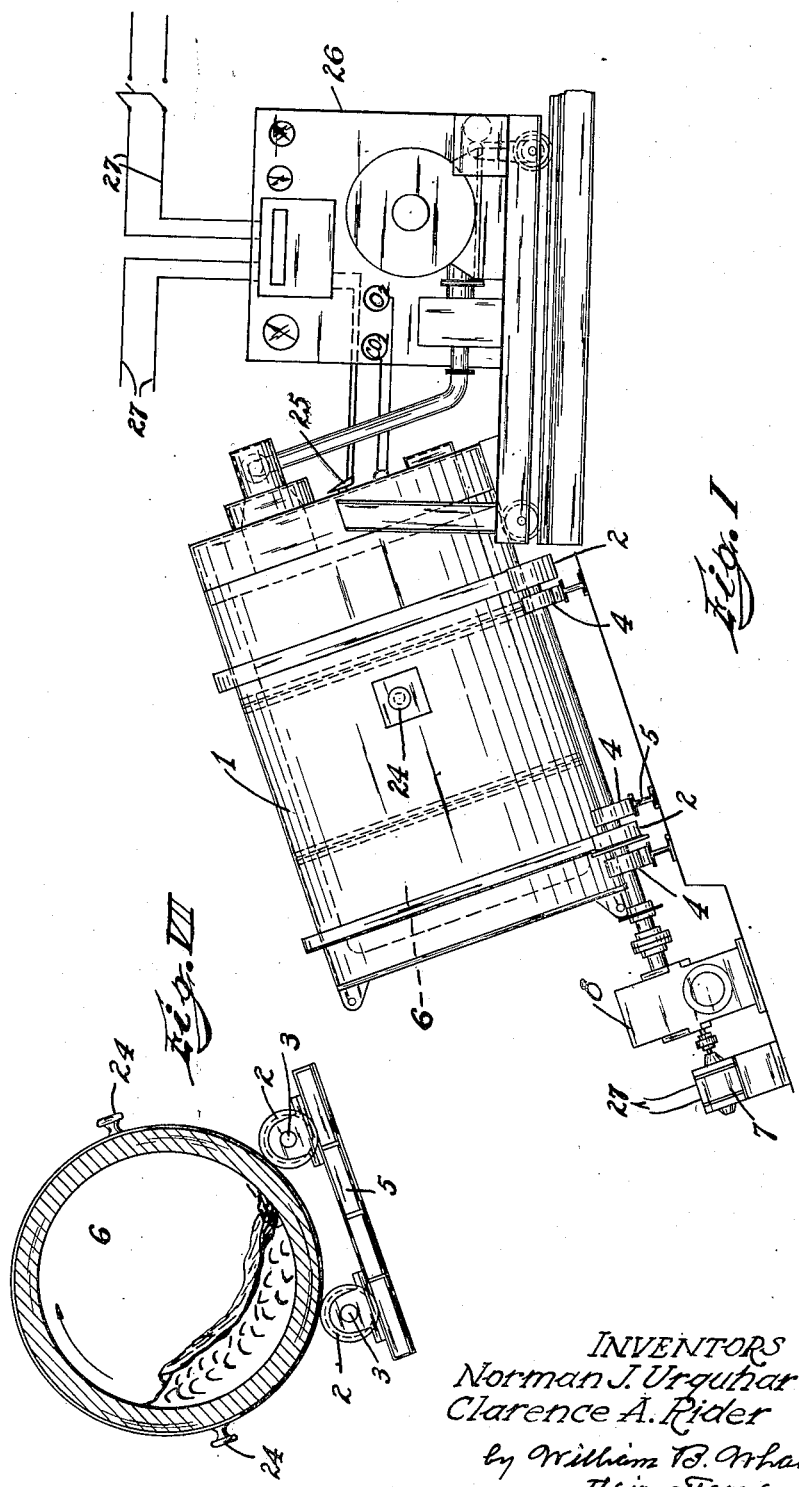
INVENTORS
Norman J. Urquhart AND
Clarence A. Rider
by William B. Wharton
their attorney

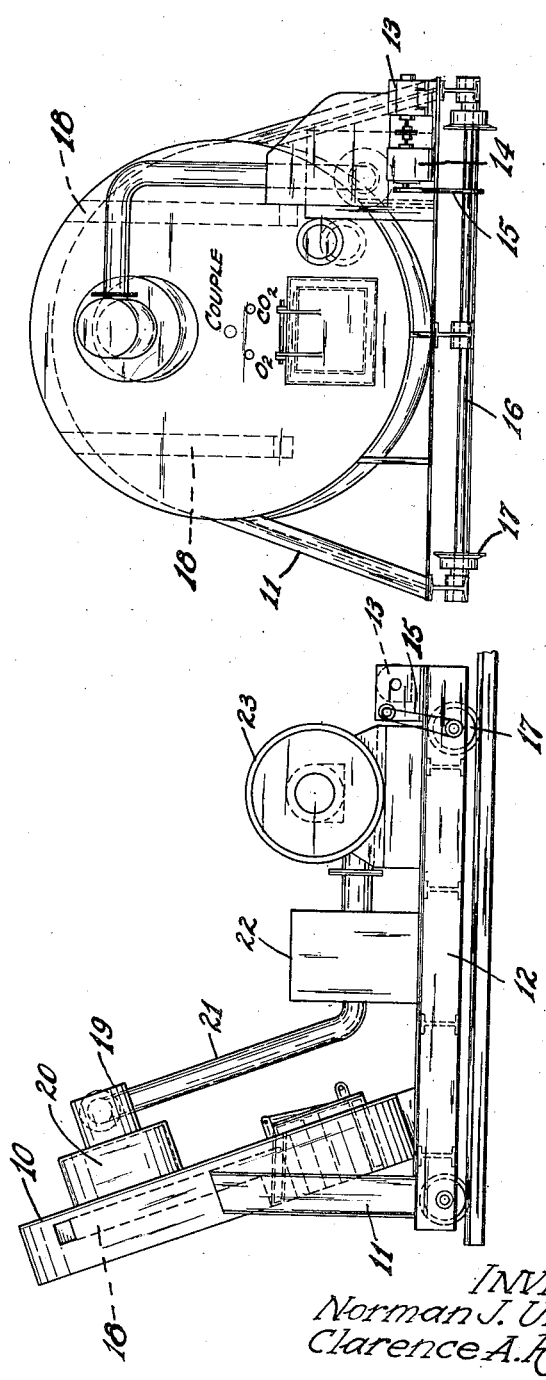

Oct. 6, 1953 N. J. URQUHART ET AL 2,654,669
METHOD OF REDUCING IRON OXIDES
Filed Oct. 2, 1951 4 Sheets-Sheet 3
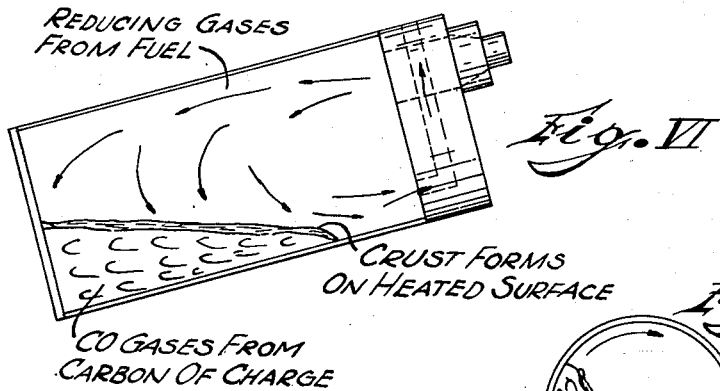
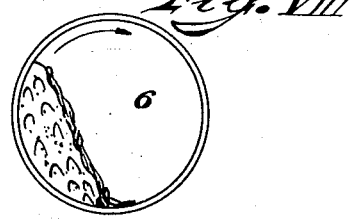
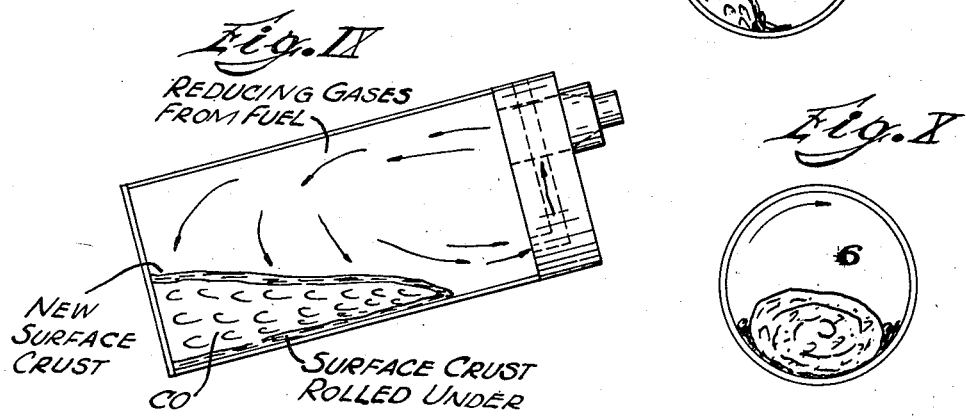
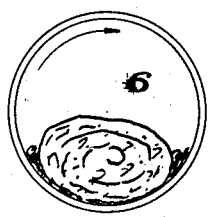
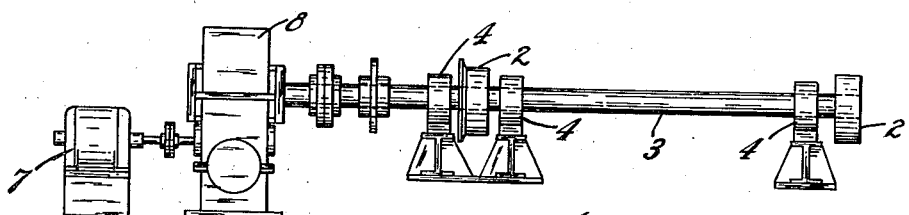
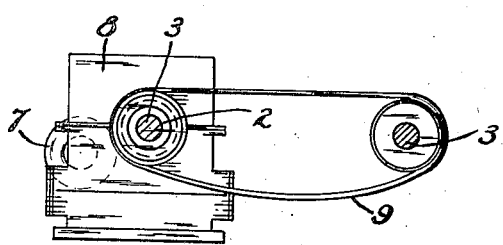
INVENTORS
Norman J. Urquhart AND
Clarence A. Rider
by William B. Wharton
their attorney

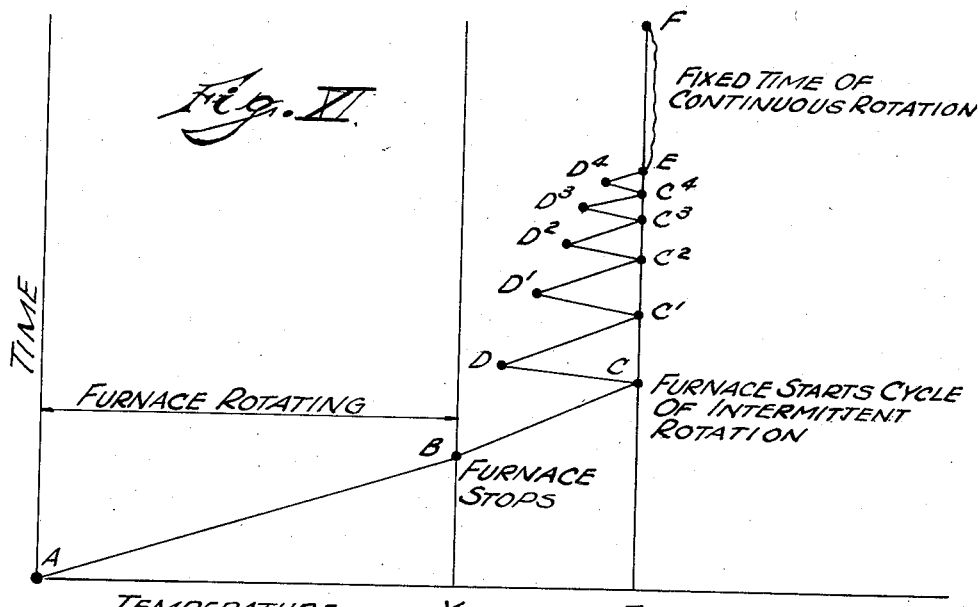
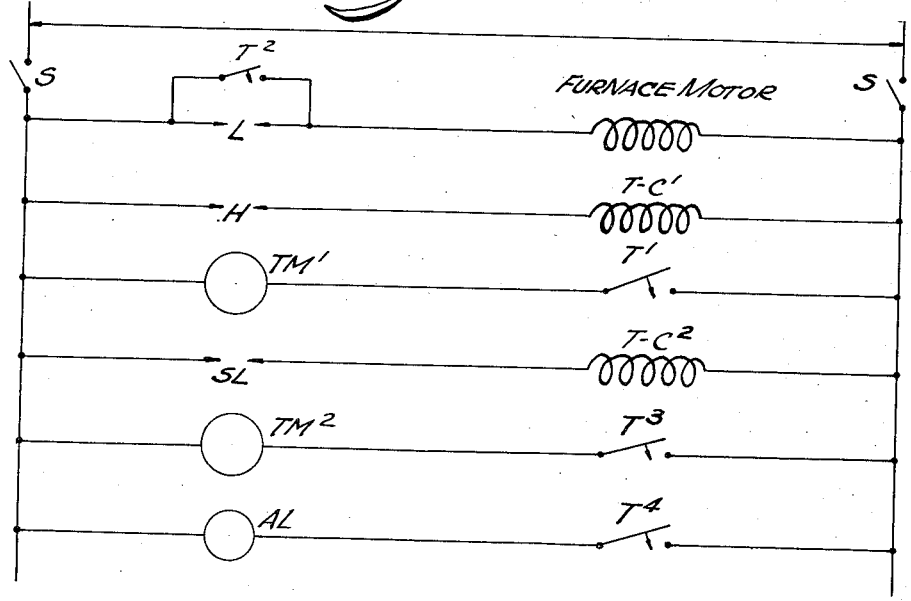

Patented Oct. 6, 1953

2,654,669

UNITED STATES PATENT OFFICE 2,654,669

METHOD OF REDUCING IRON OXIDES

Norman J. Urquhart, Scenery Hill, Pa., and Clarence A. Rider, Bridgeport, W. Va., assignors to Combustion Processes Company, Pittsburgh, Pa., a corporation of Pennsylvania Application October 2, 1951, Serial No. 249,323

4 Claims. (Cl. 75—33)

1

This invention relates to a direct method of making from iron oxides lumps consisting preponderantly of metallic iron in condition to be brought readily into the form of melting stock of good properties.

In brief, the method of the invention produces lumps of iron of cellular structure associated with viscous slag which readily may be removed mechanically to give an iron lump for melting, and produces such lumps with minimized loss of iron and under conditions leading to other striking economies in the process.

It may be taken as a matter of common knowledge that there exist many direct reduction processes capable of giving a product consisting in large part of iron combined with oxygen in lesser order than the original oxide which has been subjected to the reduction treatment. Such products have contained varying proportions of fully reduced, or metallic, iron and such proportion as has not been fully reduced has been beneficiated in greater or lesser order by improvement in the physical condition of the product and by the removal of oxygen, with respect to the original iron oxide which has been subject to the direct reduction process. Such processes have been employed in the direct reduction of magnetite, flue dust, roll scale and hematite.

Many processes for the direct reduction of iron have sought to supplant the highly expensive blast furnace by a less expensive battery of relatively small reduction units. Also some processes are capable of acting on iron oxides in very fine condition, to produce therefrom products which are in an agglomerated condition but which tend to contain an undue proportion of sulphur and other impurities.

Some proposed processes for the direct reduction of iron oxides employ the practice of forming briquettes or balls of iron oxide and carbonaceous material either as a preparatory step or by the rotation of a rotary furnace. Fluxing material usually is included in the briquettes or balls when they are preformed or is supplied to the furnace. The theory of the briquetting or balling effect is that the carbonaceous material will release CO within the briquettes or balls under heat generated in or supplied to the treating chamber of the furnace, to reduce oxide with which the carbonaceous material is in intimate association. Usually the briquettes or balls are heated by contact with freshly heated areas of the furnace wall as the furnace is rotated slowly. It has been found that the feature of compacting the components of the charge into briquettes or balls does

2 not lend itself to an intensification of the conditions of reduction sufficient to effect substantially complete reduction of the iron oxide in a single batch operation or to give a wholly desirable melting stock. This practice tends to the formation of fluid slag, which builds up on the wall of the furnace chamber and an undue proportion of which is included in the product of the treatment. Also, an undue proportion of iron is lost to the slag.

Throughout the specification and claims the word "carbon" is used to designate generically the reactive carbon used in the process, whether that carbon be supplied in relatively pure condition or as the reactive content of a carbonaceous material.

There has been the problem of providing a direct reduction process which because of effectiveness in yielding satisfactorily usable products and which because of its economic soundness recommends itself to the practical side of the steel industry. In order to fulfill that requirement, such process must be effective in supplanting or at least in facilitating in substantial order some step in the conventional steel-making procedures. It must be economical in its own procedure as well as in the equipment in which the process is performed. Specifically as to such procedure, the process should be economical in the loss of iron incurred during its performance, both in dust loss assuming that fine ores be treated and in loss by combination with or entrainment with slag formed in the process. It should be economical in its consumption of fuel and reducing agent. It should be economical in time consumed and in labor cost. The product should be suited in its composition and physical form to melting and when melted should be susceptible to various metallurgical additions and adjustments. That is, the product should be preponderantly metallic iron without excessive sulphur, silica or phosphorus and without an excessive quantity of associated slag. Further the process should be capable of performance without a substantial formation of slag and other detritus on the wall or walls of the furnace in which the process is performed. All the above and various other considerations go to make up the general economic aspect of a direct reduction process, rendering it acceptable or unacceptable to the operating men of the steel industry.

The process of this invention conforms to all the above-stated requirements of an economically successful process for the reduction of iron oxides. Also it possesses additional advantages in that it is capable of acting on various types of iron oxides commonly subjected to reduction such as hematite, magnetite, flue dust, bog ores and the like and is capable of successful operation on such oxides within a relatively wide range of particle sizes from very finely divided iron oxides up to lumps of moderate size. Similarly, carbon used as a source of reducing gas in the process may be graphite, coke, coke breeze, charcoal, anthracite or bituminous coal or other source of reactive carbon, and the carbon or carbonaceous material may likewise be used within a relatively wide range of particle sizes.

The process is one particularly susceptible of automatic control, thus eliminating the normal factor of human error and insuring successful repetitive operation of the process. The product is a good melting stock low in metalloids and relatively low in carbon.

The above discussion explains both broadly and in considerable detail the objects attained by the instant invention.

Essentially, the success of our method results from intensifying all the conditions of a reduction process for iron oxides, save only the condition of high temperature. In the process, the charge as a batch is exposed to reducing gases and to superatmospheric pressure both at the exposed surface and within the body of the charge. Quantitatively considered, the batch is highly heated. That is, the batch receives the maximum number of heat units possible without raising any portion thereof to a temperature at which a free-flowing slag is formed. The entire reducing operation is performed in the same furnace chamber. With continuance of the process, bodies of metallic iron mixed with viscous slag tend to weld to each other or otherwise to coalesce to form larger lumps.

It has been found that if the furnace comes to a complete or substantially complete stop between impulses of angular movement (i. e. movement of rotation) the process of reduction is carried forward and the formation of lumps of metallic iron is effected. Also it results in a closer approach to overall completion of the reduction and can result in bringing the product iron into the form of a few massive lumps or a single massive lump composed of metallic iron and viscous slag. By a "substantially complete" stop is meant that movement of the furnace is reduced to a minimum, a minimal movement so slight that a crust of reduction products can be formed on the exposed surface of the batch in the intervals between impulses of angular movement of the furnace chamber.

In the accompanying drawings, exemplary of apparatus suitable for performing the method of the invention or illustrating the progress of the method itself:

Fig. I is a side elevation of a rotatable, tubular batch type furnace together with associated means for opening and closing the treating chamber of the furnace, for supplying hot input atmosphere thereto and for causing angular movement of the furnace body.

Fig. II is a side elevation of the movable firing head which serves as a closure for the treating chamber of the furnace, together with means for advancing and retracting the firing head.

Fig. III is a front elevation of the firing head and its associated elements.

Fig. IV is a side elevation of actuating means for causing rotary movement of the furnace body.

Fig. V is a rear elevation of the actuating means shown in Fig. IV.

Fig. VI is a schematic vertical sectional view through the tubular body of the furnace, showing the first formation of crust on the exposed surface of the charge.

Fig. VII is a cross-sectional view through the furnace body, illustrating an initial stage in the action of turning under a crust formed at the surface of the charge in the treating chamber of the furnace.

Fig. VIII is a schematic cross-sectional view through the tubular body of the furnace, showing the first crust formation moving to the lowest region of the furnace chamber when the surface of the furnace chamber is moved angularly by rotary movement of the furnace body through part of a complete turn, this view showing a later stage in such movement than is shown in Fig. VII.

Fig. IX is a view similar to Fig. VI but showing the first-formed crust turned under the surface of the charge and a second crust forming on the surface of the charge.

Fig. X is a view similar to Fig. VIII, but showing a product lump of metallic iron and viscous slag at the end of the batch operation.

Fig. XI is a graphical view illustrating diagrammatically an exemplary operation in accordance with a sequence of steps constituting preferred practice in accordance with the method of the invention.

Fig. XII is a schematic view showing an electric circuit arrangement for placing the operation of the process as illustrated in Fig. XI under automatic electric control.

As shown, the apparatus used comprises the body 1 of a batch type furnace which is circular in cross section and which is rotatably mounted on rollers 2 carried on parallel shafts 3, in bearings 4 mounted on a platform 5 which declines toward the rearward end of the furnace body. As shown, the furnace chamber 6 is completely closed at its lower and rearward end. Rotary movement is imparted to shafts 3 which carry the rollers by an electric motor 7 which acts on one of the shafts 3 by way of speed-reducing gearing enclosed in housing 8. A belt or chain 9 transmits rotation of like sense to the other of the shafts.

At the upper and forward end of the furnace body 1 there is a firing head 10 mounted by means of standards 11 on a horizontal carriage 12 which is movable toward and away from the body of the furnace. Power for propelling carriage 12 is supplied by an electric motor 13 which acts by way of speed-reducing gearing enclosed in housing 14 and a belt or chain 15 on the shaft 16 which carries two of the wheels 17 of the carriage. As is shown in Fig. I of the drawings, firing head 10 serves in its advanced position as a closure for furnace chamber 6.

As shown in Figs. II and III, the firing head contains flues 18 having their intake openings below the axis of furnace chamber 6 and having their outlet openings high on the periphery of the firing head. In the apparatus organization shown, means for supplying a suitable input atmosphere to the furnace chamber by way of the firing head also are supported on carriage 12. Such means comprise a low velocity burner 19 including a combustion tunnel 20 in the structure of the firing head and positioned to discharge products of combustion into the furnace chamber above the axis thereof. By way of line 21, burner 19 receives an apportioned supply of fuel and air from control box 22. The air is supplied at low velocity by blower 23, which blower together with a control box 22 is mounted on carriage 12. It is apparent from the drawings and above description that the furnace body is physically freed by retraction of the firing head. The furnace may then be lifted from the rollers on which it rests by engagement of a crane with lifting trunnions 24 for facilitated charging and discharging of the furnace.

The method now will be described in detail, referring for convenience to the exemplary apparatus as herein disclosed.

Initially, the charge is introduced into the furnace chamber, which has been preheated. This introduction may be by means of a charger but with the apparatus shown is effected most easily by lifting furnace body 1 from its rollers 2 by its trunnions 24 the firing head being retracted, and by dumping an apportioned charge of iron oxide and carbon into the furnace chamber. As above noted, there is no specific requirement as to particle size for the iron oxide of the charge, it being sufficiently divided to expose a proportionally great area to heat and reducing gases. The carbon desirably is in a conformably fine condition of division. The carbon as explained may be in the relatively pure form of graphite or may be supplied by any carbonaceous material capable of providing a proportionally adequate quantity of reactive carbon, as for example coke, coke breeze, charcoal, anthracite or any of the commonly satisfactory grades of bituminous coal. The preferred apportionment of iron oxide and carbon included in the batch depends on the quantity of carbon required for reaction with the oxide, and in the case of a carbonaceous material depends also on the capacity of the material to supply reactive carbon.

After the charge material has been introduced, the furnace is rotated slowly for a time sufficient to cause uniform heating of the batch. This heating is so conducted if the carbon of the charge be supplied by coal, that the volatiles of the coal are driven off and the coal is reduced to the form of coke without forming compacted balls of the iron oxide and the coked coal. The preliminary heating of the batch is not essential, but preliminary heating or equivalent preheating is desirable from the viewpoint of accelerating the progress of reduction in the succeeding stages of the process. At a stage of heating below a slagging temperature, rotation of the furnace is stopped.

Heat other than that provided by the slow combustion of the coal is supplied by the input atmosphere introduced into the furnace chamber at the combustion tunnel in the firing head of the furnace. In order that the requirements of the process be met it is essential that such input atmosphere will be a desirable part of the total atmosphere in the furnace chamber throughout the succeeding stages of the process. The furnace chamber being sealed against infiltration of air as is possible with the exemplary apparatus shown and above described, burner operation is conducted at low velocity to produce a flame of high heating value which moves slowly under positive pressure while creating in the furnace chamber an atmosphere substantially free of $O_2$ and having a substantial content of CO. The furnace may utilize gaseous fuel, oil or powdered coal, provided the burner be of a sort adapted so to function as to provide the desired atmosphere. Specifically the burner employed is of the type disclosed in Urquhart Patents Nos. 2,458,541; 2,458,542 and 2,458,543; but any apparatus or arrangement which will introduce a combustion atmosphere of the described sort coupled with adequate heat input can be used.

With the batch lying in furnace chamber 6 in a particulate body which is of maximum thickness adjacent the closed lower and rearward end of the chamber, the surface of the batch is brought into contact with the heating and reducing effect of the furnace atmosphere. Throughout the operation of the process the input gases together with other furnace gases which are entrained by them follow the course indicated, passing from combustion tunnel 20 rearwardly of the furnace chamber, over the batch and then forwardly to discharge at the opening of flues 18 in the firing head. In this circulation any free $O_2$ which may enter with the burner products is consumed before the gases come into contact with the iron oxide of the batch. Also it is to be noted that the flues through which burner gases escape are so short that there is no stack draft to sweep out the furnace atmosphere, but that the gases circulate under the low velocity and positive pressure at which the input atmosphere enters the furnace chamber. This fact tends to economy in fuel consumption and allows a slight superatmospheric pressure to build up in the furnace chamber.

Under the above described conditions, with the furnace charge lying in an undisturbed body and with the surface of the batch directly exposed to the heating and reducing effect of the furnace atmosphere, a crust of reduced iron with some viscous slag forms on the exposed surface of the batch. While the surface on which the batch rests remains stationary, this crust gains in depth. This crust is as a whole viscous and is sufficiently cellular, or porous, to be in some measure permeable by gases generated in the underlying particulate body of the batch. It does, however, approach continuity sufficiently to retard the passage of gases into the open region of the furnace and in effect to form a seal at the surface of the batch and thus to cause pressure to build up below the crust. By holding in reducing gases and holding a pressure of such gases within the underlying portion of the batch, the crusted surface promotes the progress of reaction between the underlying iron oxide and carbon of the batch. If the crusted surface is permitted to reach too high temperature, however, a free flowing rather than a thick, viscous slag is formed. If the batch is permitted to remain static for too long a time much of the benefit derived from the crusting of its surface is neutralized.

It has been discovered that the reduction is carried forward by turning under the entire heated crust formed on the surface of the batch at one time, so that a new surface is exposed to heat and the reducing atmosphere in the furnace chamber and the highly heated crust lies below the surface of the batch. In this position the substance of the crust previously formed supplies heat to the superposed substance of the charge for promoting reaction between the iron oxide and carbon of the batch. Simultaneously the crust forming on the freshly exposed surface of the batch retards the passage of gases generated by the reaction and causes a substantial pressure to build up in the particulate body of the batch under the seal formed by the fresh crusting. This pressure is of value in forcing the reduction forward. Because of the fact that there is no stack draft in the furnace chamber to sweep out the gases therein, gases from the carbon of the charge which permeate the crust of the batch or are liberated when the crust is turned under, linger in the furnace chamber. They thus mingle with the input atmosphere in the free space within the furnace chamber, to sustain an atmosphere of definitely reducing sort at the exposed surface of the batch as well as within the particulate body of the batch.

In a rotatable tubular furnace, such as the furnace herein disclosed, the step of turning the hot crust under is caused by moving the furnace body through a partial turn, as for example through an arc sufficient to turn the crust under in the batch and expose a fresh surface of the charge material. There is no positive requirement that the furnace chamber be stopped short of one or more complete turns. It is, however, important that at this stage of the process it should not be rotated sufficiently to work iron oxide into the crusts of reduction products. The result of the turn which desirably is relatively abrupt, is to carry the batch angularly upward against gravity. In response to this movement the crust of the batch is detached from the particulate substance of the batch and tends to slide or flow first to the lowest region of the furnace chamber. The looser substance of the batch then falls on the hot crust to create the charge arrangement discussed above.

To obtain maximum reduction, the above action is repeated several times before the process is concluded. Since it is important to avoid the formation of a free-flowing slag and the surface of the batch should not be permitted to reach the liquidus temperature for so doing, the furnace body is moved angularly and a fresh surface is presented when the crust formed on the charge has reached a temperature slightly below that point. As the bodies of successive crusts are turned under, they tend to lie over each other in layers which extend over a large proportion of that region of the chamber wall which underlies the batch. Also any several separate portions of crust tend to unite. This tendency to unite or coalesce is promoted by the fact that the substance of the crusts is preponderantly metallic iron. The slag which has been formed and is associated with the iron of the crusts remains in a viscous state and does not tend to react with the iron of the crusts nor to react with or extract iron oxide from the portion of the charge which has remained unreacted. Also, at temperatures below those at which free flowing slag is formed sulphur tends to remain in the slag rather than to go into the iron.

It should be understood that the process intensifies its effectiveness in reduction as it proceeds. It is not only at the surface of the batch that reduction takes place. The particulate body of the batch also is subjected to conditions of progressively increasing intensity. As successive crusts are formed and turned under, the heating in the body of the batch is intensified with intensification of the reaction between the carbon and iron oxide of the batch and increase in the reducing composition of the atmosphere in the free space of the furnace chamber. All these progressive conditions with progressive increase in the temperature of the batch as a whole cause a progressive decrease in the time required to form successive crusts at the surface of the batch. The periods between angular movements of the furnace body thus decrease with approximate regularity as the operation proceeds.

When the charge has been brought to a condition of approximately complete reduction, the furnace is rotated continuously. Under this continuous rotation the charge having been brought preponderantly into the form of metallic iron, there is a folding and welding effect which brings the reduced charge into the form of a lump, or lumps, of cellular iron with an associated content of heavy viscous slag. This product in the form of a lump, or lumps of iron and slag is in condition for removal of the slag mechanically. Preferred procedure is to dump the body of the furnace into a squeezer and to express the slag from the lump or lumps. The lumps from which the slag has been expressed retain a very low proportion of slag and are low in sulphur, phosphorous and silicon. They are good melting stock. Also, the lumps of iron from which slag has been expressed are susceptible to shaping as by forging or rolling, without being passed through a molten state.

It will be noted that no mention is made above as to the inclusion of lime or other fluxing material in the furnace charge. In the reduction of most ores and other iron oxides by this method the inclusion of lime or equivalent material is unnecessary, but when desired a small quantity of some such material can be included. Flue dust as it is available contains some lime and it is therefore desirable in order to obtain the best results from that material carefully to limit the temperature of the batch and somewhat to extend the time of the treatment.

Some stages of the reduction operation are roughly indicated in Figs. VI to X inclusive of the drawings. Fig. VI shows the batch lying in the furnace with the initial crust formed on its surface by the reducing atmosphere in the free space of the furnace chamber and by CO generated from the carbon in the particulate body of the batch. Fig. VII shows an early stage in the angular movement of the surface on which the batch lies, with the crust at the exposed surface of the batch beginning to slide or flow to the lower region of the furnace chamber. Fig. VIII shows a later stage in this turning movement, just before the crust as a whole reaches the low region of the furnace chamber with the particulate portion of the batch following and covering it. Fig. IX shows a second crust forming on the exposed surface of the batch, with the first crust lying below the body of the charge and supplying heat thereto. Fig. X shows the reduced batch brought into the form of a single lump by continuous rotation of the furnace.

The entire reduction operation is shown graphically in Fig. XI. As there shown, the starting point for preliminary rotation of the furnace is the point "A" and the furnace rotates continuously for a time required to bring the temperature at the surface of the batch to a determined temperature "Y," this condition being indicated with respect to time at point "B." When temperature "Y" is reached, rotation of the furnace is stopped and the furnace remains still until temperature "Z" is reached. At that point "C" the furnace rotates sufficiently to turn under the crust which has formed at the surface of the batch with exposure of a fresh surface. The exposure of the fresh, less highly heated surface lowers the temperature of the furnace chamber to a point "D"

and the time required to bring the furnace chamber again to temperature "Z" is indicated by the vertical distance between point "D" and point "C¹." The total time of the "stop-go" operation of the furnace is indicated by the distance along the line C—E. It will be noted that the drop from temperature "Z" decreases progressively with each repetition of the sequence with correspondingly decreasing time periods required to restore temperature "Z." This is shown graphically by the lines C—D and D—C¹; C¹—D¹; D¹—C²; C²—D² and D²—C³; C³—D³ and D³—C⁴; C⁴—D⁴ and D⁴—E. From point E at which the temperature drop becomes proportionately slight after rotation of the furnace, the furnace rotates continuously to point F at which the operation is complete. During this period E—F, the furnace temperature is held close to temperature "Z." It should be understood that temperature "Z" is a crust-forming temperature below that at which a free-flowing slag is produced.

The operation of the method can be placed under automatic electric control by means of appropriate electrical control apparatus, to give the cycle of action shown graphically in Fig. XI. Such apparatus includes a thermocouple 25 and a control panel 26 electrically connected with the thermocouple, which relate temperature conditions and timed duration of furnace movements to the energization of furnace-rotating motor 7 from line 27.

In beginning the operation, the operator closes manual switches "S" which energizes the starter coil of motor 7, the thermally operable contacts "L" being closed. The furnace is rotated until the temperature over the charge rises to the predetermined point, that is to the temperature "Y" as shown in the diagram of Fig. XI. At this point contacts "L" open under thermal control, de-energizing motor 7. Contacts "L" remain open during the remainder of the operation. The furnace remains still while the temperature rises to the point "Z." When that temperature is reached thermally operable contacts "H" close. Closing of contacts "H" activates the coil T—C¹ to a timer clutch which closes contacts "T¹" and energizes timer motor TM¹. Timer motor TM¹ maintains contacts "T²" closed for a period of time which has been determined experimentally to give a desired rotational movement of the furnace. At the end of that period contacts "T²" open by drop in furnace temperature upon opening of thermal contacts H and the timer assembly resets itself. When the furnace is moved angularly to expose a fresh surface of the batch, thermal contacts "H" open because of the chilling effect of presenting a fresh surface.

The above action repeats itself each time the temperature above the charge rises to the point "Z." As shown in the diagram of Fig. XI, the time required to reach the crust-forming temperature decreases progressively with each repeated rotation of the furnace as the charge progressively is heated toward uniformity in temperature. Ultimately as indicated at point E in Fig. XI, the drop in temperature becomes too slight to open contacts H when the batch is turned over after temperature "Z" is reached. Contacts H remaining closed, contacts T² are under the thermal control of those contacts and remain closed without dependence on the timed control of the timer. Contacts "T²" thus remain closed and the furnace rotates continuously.

During the determined period of continuous furnace rotation shown as the period E—F in Fig. XI, this condition persists with the temperature slightly above the temperature "Z." When the furnace temperature tends to rise too far above the "Z" temperature, thermally actuated contacts "SL" close to activate timer clutch coil "TC²," to close contacts "T³" and energize timer motor "TM²" which acts on the motor (not shown) in control box 22 which operates the valves supplying fuel and air to the furnace burner to regulate burner input to the furnace. At the end of the predetermined period E—F the timer acts to open contacts "T³" and close contacts "T⁴" completing a circuit to alarm signal "AL," which may be a bell, light or other suitable agency for attracting the attention of the operator. The operator then opens the supply circuit at a switch "S" and kills the furnace operation.

The process can be exemplified by the results of a number of actual experimental runs, some of which are here given as follows:

*Example No. 1*

In this run the charge consisted of 600 pounds of hematite and 200 pounds of coke breeze both passed through a ½ inch screen. The furnace burner was fired with natural gas. The mixed charge was introduced at a temperature of 1800 degrees. A log of the run follows:

| Time | Temp, Degrees F. | Actions |
|---|---|---|
| 1:45 | 1,800 | Furnace rotating. |
| 2:05 | 2,060 | Do. |
| 2:20 | 2,180 | Do. |
| 2:25 | | Furnace set to form crust. |
| 2:45 | 2,260 | Furnace set 20 minutes. |
| 3:00 | 2,260 | Furnace set 15 minutes. |
| 3:13 | 2,280 | Furnace set 13 minutes. |
| 3:33 | 2,280 | Furnace set 10 minutes. |
| 3:40 | 2,280 | Furnace set 7 minutes. |
| 3:46 | 2,260 | Furnace set 6 minutes. |
| 3:49 | 2,260 | Furnace set 3 minutes. |
| 3:51 | 2,260 | Furnace set 2 minutes. |
| 3:54 | 2,260 | Furnace set 3 minutes. |
| 3:56 | 2,260 | Furnace set 2 minutes. |
| 3:57 | 2,260 | Furnace set 1 minute. |
| 3:57 to 4:20 | 2,280–2,290 | Furnace rotated continuously. |

The product was several large lumps of cellular metallic iron associated with viscous slag, which latter was expressed.

The hematite ore subjected to reduction corresponded closely to the conventional composition of such ores. The composition of the total charge being approximately as follows in percentage by weight and in pounds:

60% Fe content of ore_____lbs__ 360
18% Oxygen content of ore_____lbs__  65
19% Gangue of ore_____lbs__ 115
10% Moisture of ore_____lbs__  60
89% Combustibles of coke breeze_____lbs__ 178
11% Gangue of coke breeze_____lbs__  22

Products after reduction and lumping:

Process and dust loss_____lbs__  34
  Combustion of coke breeze_____lbs__ 178
  Moisture expelled_____lbs__  60
  Oxygen expelled_____lbs__  65

Total decrease in weight_____lbs__ 337
Weight of discharged lump (Fe content of lump 76%)_____lbs__ 463
Weight of slag expressed (Fe content of slag 12%=15 lbs.)_____lbs__ 125
Weight of iron in lumps_____lbs__ 338
Weight of iron lost in processing_____lbs__   7
Weight of iron lost in slag_____lbs__  15
Theoretical recovery_____lbs__ 360
Actual recovery_____lbs__ 338
Recovered Fe of ore_____percent__ 94

The metallic iron of the squeezed lump showed by analysis 99.7% Fe and .080 S.

Example No. 2

In this run the charge consisted of 600 pounds of hematite ore almost identical with the hematite of the charge in Example No. 1 and 240 pounds of bituminous coal. Both the ore and the coal were passed through a ¾ inch screen. The burner was fired with Bunker C fuel oil. The log of the run was as follows:

| Time | Temp., Degrees F. | Action |
|---|---|---|
| 10:20 | 1,800 | Furnace rotation. |
| 11:00 | 2,160 | Furnace set to form crust. |
| 11:20 | 2,280 | Furnace moved through ¼ turn. |
| 11:20 | 2,160 | Immediately after furnace movement. |
| 11:32 | 2,280 | Furnace moved through ¼ turn. |
| 11:32 | 2,180 | Immediately after furnace movement. |
| 11:42 | 2,280 | Furnace rotated through ¼ turn. |
| 11:42 | 2,195 | Immediately after furnace movement. |
| 11:50 | 2,280 | Furnace rotated through ¼ turn. |
| 11:50 | 2,220 | Immediately after furnace movement. |
| 11:55 | 2,280 | Furnace rotated through ¼ turn. |
| 11:55 | 2,230 | Immediately after furnace movement. |
| 11:59 | 2,280 | Furnace moved through ¼ turn. |
| 11:59 | 2,250 | Immediately after furnace movement. |
| 12:01 | 2,280 | Furnace moved through ¼ turn. |
| 12:01 | 2,265 | Immediately after furnace movement. |
| 12:02 to 12:24 | 2,280 | Furnace rotated continuously then discharged. |

It should be understood that in the intervals between the furnace movements as noted, the furnace remained "set" as in Example No. 1. In this run notation is made as to temperature drop after each furnace movement, which drop occurred but was not chartered in the run of Example No. 1.

At the end of the furnace operation the charge in the form of a single large lump of iron and viscous slag was discharged and the slag was expressed.

A charge analysis gave the following:

| | | |
|---|---|---|
| 60% Fe content of ore | lbs | 360 |
| 10% Moisture content of ore | lbs | 60 |
| 18% Oxygen content of ore | lbs | 65 |
| 11% Gangue of ore | lbs | 115 |
| 10% Gangue of coal | lbs | 24 |
| 90% Combustibles of coal | lbs | 216 |
| Total | lbs | 840 |

Products after Reduction and Lumping:

| | | |
|---|---|---|
| Process and dust loss | lbs | 40 |
| Combustion of coal | lbs | 216 |
| Moisture expelled | lbs | 60 |
| Oxygen expelled | lbs | 65 |
| Total decrease in weight | lbs | 381 |

| | | |
|---|---|---|
| Weight of discharged lum (Fe content of lump 73%) | lbs | 459 |
| Weight of slag expressed (Fe content of slag 12%) | lbs | 139 |
| Weight of iron in lump | lbs | 320 |
| Loss of iron in processing | lbs | 24 |
| Loss of iron in slag | lbs | 16 |
| Theoretical recovery | lbs | 360 |
| Actual recovery | lbs | 320 |
| Recovered Fe of ore | percent | 89 |

The metallic iron of the squeezed lump showed by analysis 98.8 Fe and .0628.S.

Example No. 3

In the run of this example the iron oxide was flue dust, having 8% of its weight composed of associated carbon. Thus 3/10 of the desired weight of carbon being already present in the flue dust, the added coal required for the operation can be decreased in weight. Thus the charge contained 600 pounds of flue dust, which gives 300 pounds of Fe content. This flue dust was mixed with 90 pounds of coke breeze to make up the charge. This charge similarly was introduced into the furnace chamber which was fired with natural gas and had been preheated to about 1800° F. and the furnace was rotated for ½ hour uniformly to heat the charge. During this period of rotation the temperature in the furnace chamber over the charge rose to about 2120° F. Rotation of the furnace then was stopped and the furnace remained set until a crust of substantial thickness had formed at the surface of the charge. The log of this run was as follows:

| Time | Temp., Degrees F. | Action |
|---|---|---|
| 1:30 | 1,800 | Furnace rotating. |
| 2:20 | 2,180 | Furnace set to form crust. |
| 2:45 | 2,250 | Furnace moved through ¼ turn. |
| 2:45 | 2,250 | Immediately after furnace movement. |
| 3:05 | 2,250 | Furnace moved through ¼ turn. |
| 3:05 | 2,280 | Immediately after furnace movement. |
| 3:22 | 2,250 | Furnace moved through ¼ turn. |
| 3:22 | 2,200 | Immediately after furnace movement. |
| 3:32 | 2,250 | Furnace moved through ¼ turn. |
| 3:32 | 2,220 | Immediately after furnace movement. |
| 3:37 | 2,250 | Furnace moved through ¼ turn. |
| 3:37 | 2,240 | Immediately after furnace movement. |
| 3:40 | 2,260 | Furnace moved through ¼ turn. |
| 3:40 | 2,255 | Immediately after furnace movement. |
| 3:42 to 4:05 | 2,260 | Furnace moved through ¼ turn and then rotated continuously. |

The product was a single large lump of iron with associated slag. The iron after the slag was expressed was a good melting stock.

A charge analysis gave the following:

| | | |
|---|---|---|
| 50% Fe content of flue dust | lbs | 300 |
| 7% Moisture of flue dust | lbs | 42 |
| 18% Oxygen content of flue dust | lbs | 54 |
| 17% Gangue of flue dust | lbs | 154 |
| 8% Carbon in flue dust | lbs | 48 |
| 11% Gangue in coke breeze | lbs | 10 |
| 89% Combustibles of coke breeze | lbs | 80 |
| Total | lbs | 690 |

Products of Reduction and Lumping:

| | | |
|---|---|---|
| Process and dust loss | lbs | 35 |
| Combustion of total carbon | lbs | 123 |
| Moisture expelled | lbs | 42 |
| Oxygen expelled | lbs | 54 |
| Total | lbs | 254 |

| | | |
|---|---|---|
| Weight of discharged lump (Fe content of lump 70%) | lbs | 436 |
| Weight of slag expressed (Fe content of slag 11%) | lbs | 128 |
| Weight of iron in lump | lbs | 265 |
| Weight of iron lost in process | lbs | 15 |
| Weight of iron lost to slag | lbs | 18 |
| Theoretical recovery | lbs | 300 |
| Actual recovery | lbs | 265 |
| Recovered Fe of ore | percent | 88.5 |

Analysis of the squeezed lump gave: 97.6% Fe and .0518% sulphur.

Example No. 4

In this run the charge consisted of 600 pounds of magnetite ore and 200 pounds of bituminous coal all of which passed through a ¾ inch screen. The furnace burner was fired with Bunker C oil.

The charge was introduced at a furnace temperature of 1800° F. A log of the run follows:

| Time | Temp., Degrees F. | Action |
|---|---|---|
| 12:30 | 1,800 | Furnace rotating. |
| 1:00 | 2,100 | Do. |
| 1:15 | 2,200 | Furnace set to form crust. |
| 1:35 | 2,280 | Furnace moved through ¼ turn. |
| 1:35 | 2,180 | Immediately after furnace movement. |
| 1:55 | 2,280 | Furnace moved through ¼ turn. |
| 1:55 | 2,200 | Immediately after furnace movement. |
| 2:10 | 2,280 | Furnace moved through ¼ turn. |
| 2:10 | 2,230 | Immediately after furnace movement. |
| 2:16 | 2,280 | Furnace moved through ¼ turn. |
| 2:16 | 2,245 | Immediately after furnace movement. |
| 2:18 | 2,280 | Furnace rotated through ¼ turn. |
| 2:18 | 2,260 | Immediately after furnace movement. |
| 2:30 to 2:50 | 2,280 | Furnace is rotated continuously. |

A charge analysis gave the following:

| | |
|---|---|
| 63% Fe content of the ore _____lbs__ | 378 |
| 7% Moisture content of the ore _____lbs__ | 42 |
| 18% Oxygen content of the ore _____lbs__ | 68 |
| 19% Gangue content of the ore _____lbs__ | 112 |
| 90% Combustibles of the coal _____lbs__ | 180 |
| 10% Gangue of the coal _____lbs__ | 20 |
| Total _____lbs__ | 800 |

Products of Reduction and Lumping:

| | |
|---|---|
| Process and dust loss _____lbs__ | 40 |
| Combustion of the coal _____lbs__ | 180 |
| Moisture expelled _____lbs__ | 42 |
| Oxygen expelled _____lbs__ | 68 |
| Total decrease in weight _____lbs__ | 330 |
| Weight of discharged lump (Fe content of the lump was 75%) _____lbs__ | 470 |
| Weight of slag expressed (Fe content of the slag 12%) _____lbs__ | 132 |
| Weight of iron in the lump _____lbs__ | 338 |
| Weight of iron lost in process _____lbs__ | 24 |
| Weight of iron lost in slag _____lbs__ | 24 |
| Theoretical recovery _____lbs__ | 378 |
| Actual recovery _____lbs__ | 338 |
| Recovered Fe of ore _____percent__ | 89 |

Analysis of squeezed lump: 92.8% Fe, .095% S, 1.33% C.

It will be noted that none of the foregoing examples includes lime, or its equivalent, as a component of the furnace charge. As mentioned above, it has been found desirable in the present process to omit lime or at least to include lime sparingly. Exercising care in the process to avoid a temperature at which free-flowing slag is formed, there is thus a minimum loss of iron to the slag during an operation of the process. Such slag as is formed from the gangue of the ore and from the noncombustible content of the coal is a heavy viscous slag, which as explained does not react freely with the iron of the charge and which is readily expressed from the hot lump, or lumps of reduction product discharged from the furnace.

As indicated above, the success of the present process results primarily from the repeated step of forming a crust of reduction products at the exposed surface of the particulate batch in the furnace chamber and turning successive crusts under in the batch to expose a fresh surface to the heat and reactive atmosphere in the free space of the furnace chamber. The general conditions sustained during performance of the method include several contributory factors.

Being a batch process the furnace chamber in which the process is performed can be sealed and uniformity in the furnace atmosphere can be maintained. The input atmosphere of the furnace chamber is of a sort to supplement the atmosphere created within the particulate body of the charge in promoting and sustaining the reducing reactions. Also the particulate charge, or batch is exposed to a blend of the input and generated atmospheres and to a temperature sufficiently high to promote reaction between the oxides and carbon of the batch, but below a temperature at which free-flowing slag is formed, for time periods sufficient to form the crusts. Such time is provided by intermittent angular movement of the furnace with the surface of the batch being exposed to crust-forming conditions in the intervals between angular furnace movements.

The progressive formation of hot crusts of reduction products on the particulate body of the charge and the turning under of the substance of successive crust formations, causes reduction to proceed positively to substantial completion in localized regions of the charge. The crust formations tend to retard the escape of gases from the batch and thus to build up in the substance of the charge a pressure tending to carry forward the desired reactions in the body of the batch. The effect in the body of the batch is promoted by the hot substance of the crusts which are turned under the surface of the batch. The particles of the underlying components of the batch are therefore brought to the surface in condition readily to form successive crusts of reduction products. The total result is thus to intensify all the conditions favorable to reduction, save only the condition of excessively high temperature. The result is economy in the consumption of fuel, reducing agent and time in so doing. Also the conditions maintained during the process are unfavorable to the loss of iron to the slag and to dust loss. It may be noted that in the operations of this process the average dust loss is about 4.5%, as compared with an average dust loss up to about 8% in blast furnace practice and about 15% in practice of a continuous direct reduction process on ores of the same grade and in the same condition.

Further, the fact that the process can be put under automatic control insures uniformity in the results of the process in successive runs when acting on charges of like composition. The key conditions for any specific operation can be observed and put under automatic control for all subsequent runs, thus eliminating variations in procedure and avoiding undesired results rising from inattention or mistake of an operator.

It will have been noted that the process described above is conducted in a single furnace chamber. That is, one furnace is not employed for the purpose of beneficiation and a second furnace of different construction employed to carry forward the reduction of the iron oxide and bring the batch into the form of massive lumps. Also it will have been noted that the process is a single-stage process which is progressive in the furnace chamber from the introduction of the particulate mass of iron oxide and carbon to the discharge of that batch in lumps composed of metallic iron and viscous expressible slag. There are great advantages inherent in a process so conducted.

Attention is called to the fact that all the ores treated above are what is known as "high grade" ores. The flue dust which is the equivalent of an ore having an Fe content of 50% is the iron oxide of the lowest Fe content. It has been found that a modification should be made in the reduction of those ores which are known as "low grade" ores, that is those ores having an Fe content below about 35–40%. In those ores the gangue content is present in such excess that it becomes impracticable in a single stage to form the charge into a lump of metallic iron and expressible viscous slag. The profusion of gangue and the excessive formation of slag retards the reaction between the carbon and the iron oxide of the ore and prevents particles of iron from coalescing to form a heat-conductive nucleus for the progress of reduction. Attempts to force the desired reduction of the iron oxide of the ore result in the profuse production of a liquid slag, which blocks the progress of reduction and causes a prohibitive loss of iron to the slag.

For the above reasons it is highly desirable that low grade ores be subjected to a beneficiation process before they are subjected to complete reduction. The preparatory beneficiation may be effected by any method capable of bringing the iron oxide to a condition in which it can be separated magnetically or mechanically from the gangue of the ore.

The preferred procedure is, however, to adopt a modification of the present process for benefication when low grade ores are charged to the furnace. Such modification divides the actual reducing operation into a two-stage process, with an intermediate stage involving separation or classification. In this modification the low grade ore and carbon are charged to the tubular rotary furnace, initial preliminary heating of the batch in the furnace takes place under continuous furnace rotation as in the single stage operation. The same general sequence of crust-forming rest periods interrupted by abrupt angular movements of the furnace that is employed in the single stage operation of the furnace is similarly followed in the modified operation. The proportion of carbon in the charge is desirably somewhat less than is included in the single stage operation as performed on iron oxides of higher grade. The temperature desirably is held somewhat lower than in the single stage operation for assurance that a liquid slag is not formed and the sequence is discontinued short of the point at which maximum reduction would be effected if high grade ore were to be charged to the furnace. Continuous rotation is not used as a terminal step to bring the products of the treatment into the form of massive lumps, or balls, but those products without attempted alteration in their form are discharged from the furnace and cooled.

When the products of the beneficiation stage have been cooled, they are crushed and magnetically or mechanically separated. The recovered portion of the products comprises some metallic iron and a larger quantity of product the Fe content of which has been greatly increased. This portion of the product having been in large measure separated from the gangue initially associated with it, then is returned to the batch type furnace in which it was produced or is introduced into an approximately identical furnace. With this beneficiated material there is supplied carbon in a quantity proportionally less than is used in a single stage operation.

The final stage of the operation is identical with the single stage operation previously described in which an iron oxide is brought to a state of substantially complete reduction. In this second stage, also there is a stop-go operation of the furnace, with crust formation of the batch during the periods of quiescence and the successive crusts turned under in the batch during abrupt angular movements of the furnace. Because the charge is partway along in the progress of reduction, however, the total time required for reduction is substantially less than in operating on a charge of raw oxide. When maximum reduction has been effected, the furnace is rotated continuously to bring the products of reduction into the form of a few massive lumps or a single massive lump of metallic iron associated with a relatively small quantity of viscous, expressible slag. From a practical viewpoint these lumps are identical with the lumps produced in a single stage operation.

It should be understood that the two (or three) stage operation on low grade ore involves proportionally more loss of iron than does a single stage operation performed on a high grade ore. There is some loss of iron to slag in the first stage of the process and loss of iron in the mechanical crushing and separation of the products from that stage. The process as conducted on low grade ore in the manner described does, however, give a recovery about 80–85% the Fe content of the ore. Since the preparatory stage and the final stage each take substantially less furnace time than the single stage operation, the total furnace time taken by the divided operation does not exceed greatly the furnace time consumed in the single stage practice of the method.

It should be noted the second, or final, reduction stage of the practice on low grade ores corresponds in detail to the single-stage practice of the method. The preferred preparatory stage likewise corresponds to that practice save in its omission of the final step of rotating the furnace continuously to decrease the number and increase the size of the lumps of iron and viscous slag formed by the progress of reduction. Because of this conformity the same furnace or two identical furnaces can be used in both stages of the process as practiced on low grade ores. Also the same furnace can be used to operate in a single stage on high grade ores, without structural alteration. It is therefore possible for a battery of the furnaces to operate partly on high grade and partly on low grade ores or for all the furnaces of the battery to operate on ores of either sort, as may be most expedient.

We claim as our invention:

1. The method of reducing iron oxide by supporting a particulate batch of iron oxide and carbon in the chamber of a rotatable tubular furnace, sustaining a reducing atmosphere over the said particulate batch, repeatedly raising substance of the batch at the surface thereof to a crust-forming temperature below that at which free-flowing slag is formed and by successive intermittent angular movements of the said furnace chamber turning under in the particulate batch successive crusts of reduction products formed at the surface of the batch while repeatedly bringing fresh substance of the batch to the surface thereof for exposure to the crust-forming gases and temperature of the said furnace atmosphere.

2. The method of reducing iron oxide by supporting a particulate batch of iron oxide and carbon in the chamber of a rotatable tubular furnace, sustaining a reducing atmosphere over the said particulate batch, repeatedly raising substance of the batch at the surface thereof to a crust-forming temperature below that at which free-flowing slag is formed and by successive intermittent angular movements of the said furnace chamber turning under in the particulate batch successive crusts of reduction products formed at the surface of the batch while repeatedly bringing fresh substance of the batch to the surface thereof for exposure to the crust-forming gases and temperature of the said furnace atmosphere, and automatically timing angular movements of the said rotatable tubular furnace to define the successive periods of crust formation.

3. The method of reducing iron oxide by supporting a particulate batch of iron oxide and carbon in the chamber of a rotatable tubular furnace, sustaining a reducing atmosphere over the said particulate batch, repeatedly raising substance of the batch at the surface thereof to a crust-forming temperature below that at which free-flowing slag is formed and by successive intermittent angular movements of the said furnace chamber turning under in the particulate batch successive crusts of reduction products formed at the surface of the batch while repeatedly bringing fresh substance of the batch to the surface thereof for exposure to the crust-forming gases and temperature of the said furnace atmosphere, and then, when, the said particulate batch has been brought largely into the condition of reduction products by repeated crust formation, rotating the said furnace chamber continuously to agglomerate the said reduction products into the form of lumps composed of iron and viscous expressible slag.

4. The method of reducing iron oxide by supporting a particulate batch of iron oxide and carbon in the chamber of a rotatable tubular furnace, sustaining a reducing atmosphere over the said particulate batch, repeatedly raising substance of the batch at the surface thereof to a crust-forming temperature below that at which free-flowing slag is formed and by successive intermittent angular movements of the said furnace chamber turning under in the particulate batch successive crusts of reduction products formed at the surface of the batch while repeatedly bringing fresh substance of the batch to the surface thereof for exposure to the crust-forming gases and temperature of the said furnace atmosphere, then, when, the said particulate batch has been brought largely into the condition of reduction products by repeated crust formation, rotating the said furnace chamber continuously to agglomerate the said reduction products into the form of lumps composed of iron and viscous expressible slag, and automatically timing movements of the said rotatable tubular furnace to define the successive periods of crust formation and the period of continuous furnace rotation.

NORMAN J. URQUHART.
CLARENCE A. RIDER.

References Cited in the file of this patent

UNITED STATES PATENTS

| Number | Name | Date |
|---|---|---|
| Re. 9,833 | Siemens | Aug. 9, 1881 |
| 802,493 | Blair | Oct. 24, 1905 |
| 930,764 | Jones | Aug. 10, 1909 |
| 1,380,767 | Booth | June 7, 1921 |
| 1,819,164 | Hartenstein | Aug. 18, 1931 |
| 1,917,942 | Kalling et al. | July 11, 1933 |
| 2,116,554 | Bardue | May 10, 1938 |
| 2,228,702 | Johannsen | Jan. 14, 1941 |
| 2,506,618 | Sainderichin | May 9, 1950 |